United States Patent
Baldwin et al.

(10) Patent No.: US 7,023,311 B2
(45) Date of Patent: Apr. 4, 2006

(54) OVERLAPPED SUPERCONDUCTING INDUCTIVE DEVICE

(75) Inventors: Thomas L. Baldwin, Tallahassee, FL (US); James A. Ferner, Battle Ground, WA (US)

(73) Assignee: Florida State University Research Foundation, Tallahassee, FL (US)

( * ) Notice: Subject to any disclaimer, the term of this patent is extended or adjusted under 35 U.S.C. 154(b) by 154 days.

(21) Appl. No.: 10/811,746

(22) Filed: Mar. 29, 2004

(65) Prior Publication Data

US 2005/0212634 A1   Sep. 29, 2005

(51) Int. Cl.
*H01F 30/12* (2006.01)

(52) U.S. Cl. ............................. 336/5; 336/182; 336/220; 335/216

(58) Field of Classification Search ................. 336/5, 336/180, 182, 214, 220, 221; 335/216
See application file for complete search history.

(56) References Cited

U.S. PATENT DOCUMENTS

| 5,581,220 | A | * | 12/1996 | Rodenbush et al. | ........ 335/216 |
| 5,604,473 | A | * | 2/1997 | Rodenbush | .................. 335/216 |
| 5,659,277 | A | * | 8/1997 | Joshi et al. | .................. 335/216 |
| 5,912,607 | A | * | 6/1999 | Kalsi et al. | .................. 335/216 |
| 2002/0130748 | A1 | * | 9/2002 | Rhyner et al. | .............. 336/182 |

* cited by examiner

*Primary Examiner*—Anh Mai
(74) *Attorney, Agent, or Firm*—J. Wiley Horton

(57) ABSTRACT

An electrical device operating on the principle of induction, such as a transformer. The device employs High Temperature Superconductors to build pancake coils having a very low height to diameter ratio. These pancake coils are placed around ferromagnetic core legs as in a conventional transformer. In multiphase applications, the low height to diameter ratio of the pancake coils causes the transformer to become quite wide. The present invention proposes overlapping the adjacent pancake coils in a multiphase induction device to reduce the width. A specific example of a 3-phase power transformer is presented.

6 Claims, 4 Drawing Sheets

OVERLAPPED SUPERCONDUCTING INDUCTIVE DEVICE

STATEMENT REGARDING FEDERALLY SPONSORED RESEARCH OR DEVELOPMENT

Some of the research leading to the development of the proposed invention was sponsored by the Office of Naval Research, under CAPS Program N 00014-00-1-0778.

CROSS-REFERENCES TO RELATED APPLICATIONS

Not Applicable.

MICROFICHE APPENDIX

Not Applicable

BACKGROUND OF THE INVENTION

1. Field of the Invention

This invention relates to the field of electrical devices. More specifically, the invention comprises a novel construction for an inductive device such as a transformer.

2. Description of the Related Art

FIG. 1 illustrates a prior art transformer 10. The components are housed within tank 12, the front half of which is cutaway in the view. This particular transformer is of the 3-phase variety, as is typically used in power transmission equipment. It has three vertical assemblies, one for each phase. The first phase is assembled upon phase 1 core leg 18, the second upon phase 2 core leg 20, and the third upon phase 3 core leg 22. Upper yoke 14 and lower yoke 16 structurally support the three core legs.

The windings for all three phases are identical (phase 1 winding 28, phase 2 winding 30, and phase 3 winding 32). Those skilled in the art will known that many different types of transformer windings are employed for power transmission devices. While the particular type of winding is unimportant to the present invention, a concentric-type winding is illustrated. With reference to phase 1 winding 28, the reader will observe that low voltage winding 26 is placed immediately around phase 1 core leg 18. High voltage winding 24 is then placed around low voltage winding 26.

Of course, a complete description of a transformer would include dielectric insulators, cooling fluids or gases, and various coil taps used to deliver the primary voltage and extract the secondary voltage. As these devices are well understood by those skilled in the art, they will not be illustrated nor described. However, in reviewing FIG. 1, the reader will be generally familiar with a typical construction for prior art 3-phase transformers.

BRIEF SUMMARY OF THE INVENTION

The present invention is an electrical device operating on the principle of induction, such as a transformer. The device employs High Temperature Superconductors to build pancake coils having a very low height to diameter ratio. These pancake coils are placed around ferromagnetic core legs as in a conventional transformer. In multiphase applications, the low height to diameter ratio of the pancake coils causes the transformer to become quite wide. The present invention proposes overlapping the adjacent pancake coils in a multiphase induction device to reduce the width. A specific example of a 3-phase power transformer is presented.

REFERENCE NUMERALS IN THE DRAWINGS

| 10 | transformer | 12 | tank |
|---|---|---|---|
| 14 | upper yoke | 16 | lower yoke |
| 18 | phase 1 core leg | 20 | phase 2 core leg |
| 22 | phase 3 core leg | 24 | high voltage winding |
| 26 | low voltage winding | 28 | phase 1 winding |
| 30 | phase 2 winding | 32 | phase 3 winding |
| 34 | low aspect pancake coil | 36 | low aspect transformer |
| 38 | high voltage pancake coil | 40 | low voltage pancake coil |
| 42 | turn | 44 | overlapped transformer |

DETAILED DESCRIPTION OF THE INVENTION

Figure 2:
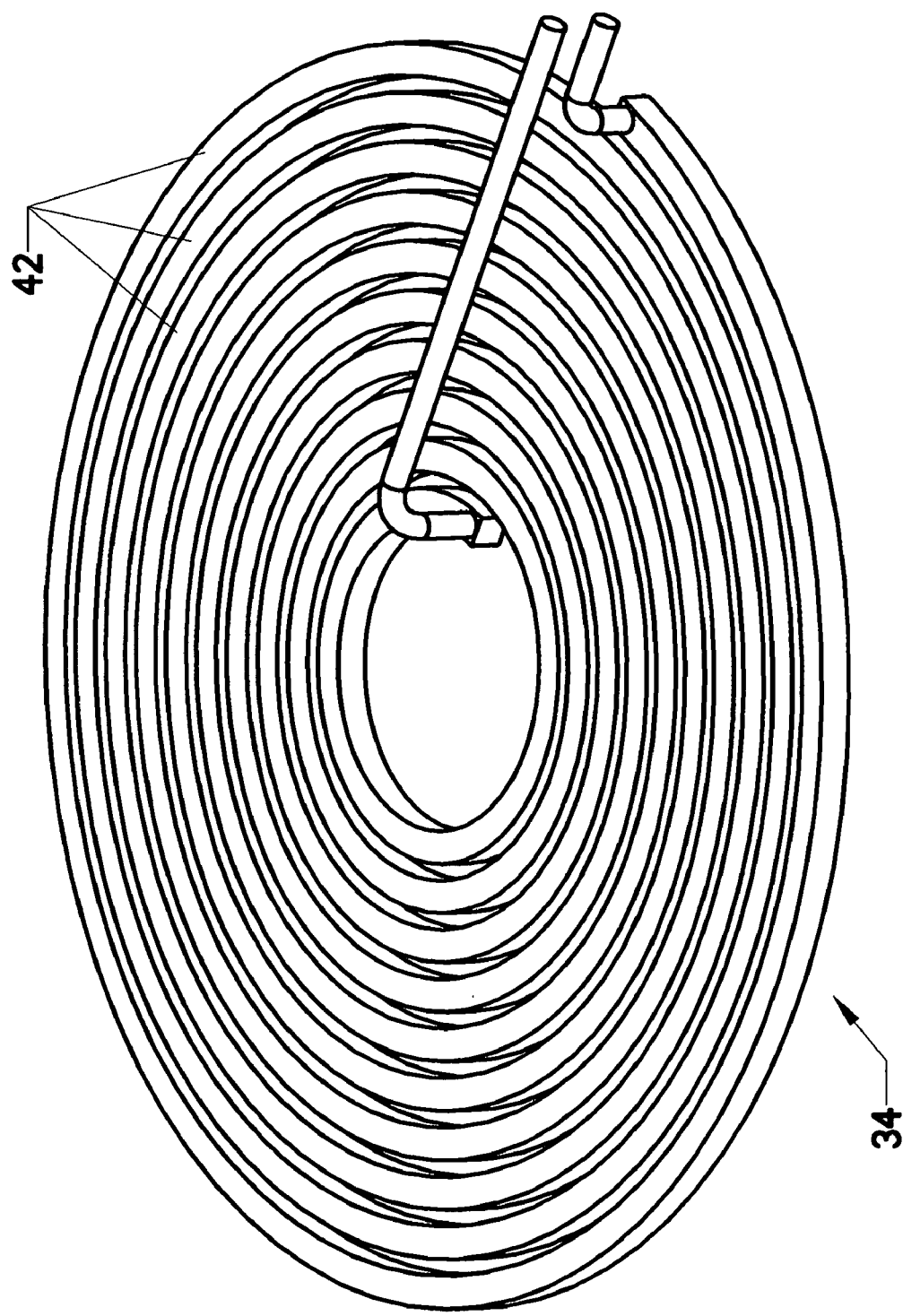
FIG. 2 is an isometric view, showing a pancake coil.

Those skilled in the art will know that "pancake" type coils have been in common use for several decades. These coils are formed in many different fashions. They all have the common trait of a low height to diameter ratio. FIG. 2 shows low aspect pancake coil 34. It is made of a plurality of turns 42, which are electrically connected in series. While the method of connection is again unimportant to the present invention, the particular version shown in FIG. 2 employs a spiral path. Such pancake coils may be stacked and connected in series in order to create additional turns.

Low aspect pancake coil 34 has an inner circumference, an outer circumference, and a height (The thickness of the "pancake"). It is said to be a "low aspect" pancake because the difference between the diameter at the outer circumference and the diameter at the inner circumference is significantly greater than the height of the coil. Thus, it has a thin "pancake" shape.

Transformers have traditionally been constructed with copper or aluminum conductors. However, recent advances in the field of superconductivity have created the opportunity to construct transformers using superconducting material. High Temperature Superconductors ("HTS") are particularly advantageous, since they do not require the extreme cold traditionally needed in order for conventional materials to exhibit superconductivity (ordinarily around 4 degrees Kelvin, using coolants such as liquid Helium). Of course, the phrase "high temperature" is a subjective one. Cryogenic cooling—the use of liquefied gases—is still needed for HTS materials. However, this can be relatively "mild" cryogenic cooling using liquid Nitrogen (around 77 degrees Kelvin).

Although it has long been known to create pancake type coils, the efficiency of such devices was traditionally limited by the relatively small amount of Ampere-Turns they could create. It is now possible to construct a pancake coil using superconducting tape conductors (made of HTS materials). These are wound into a shape generally similar to the configuration shown in FIG. 2, although they would often employ many more turns.

Figure 1:
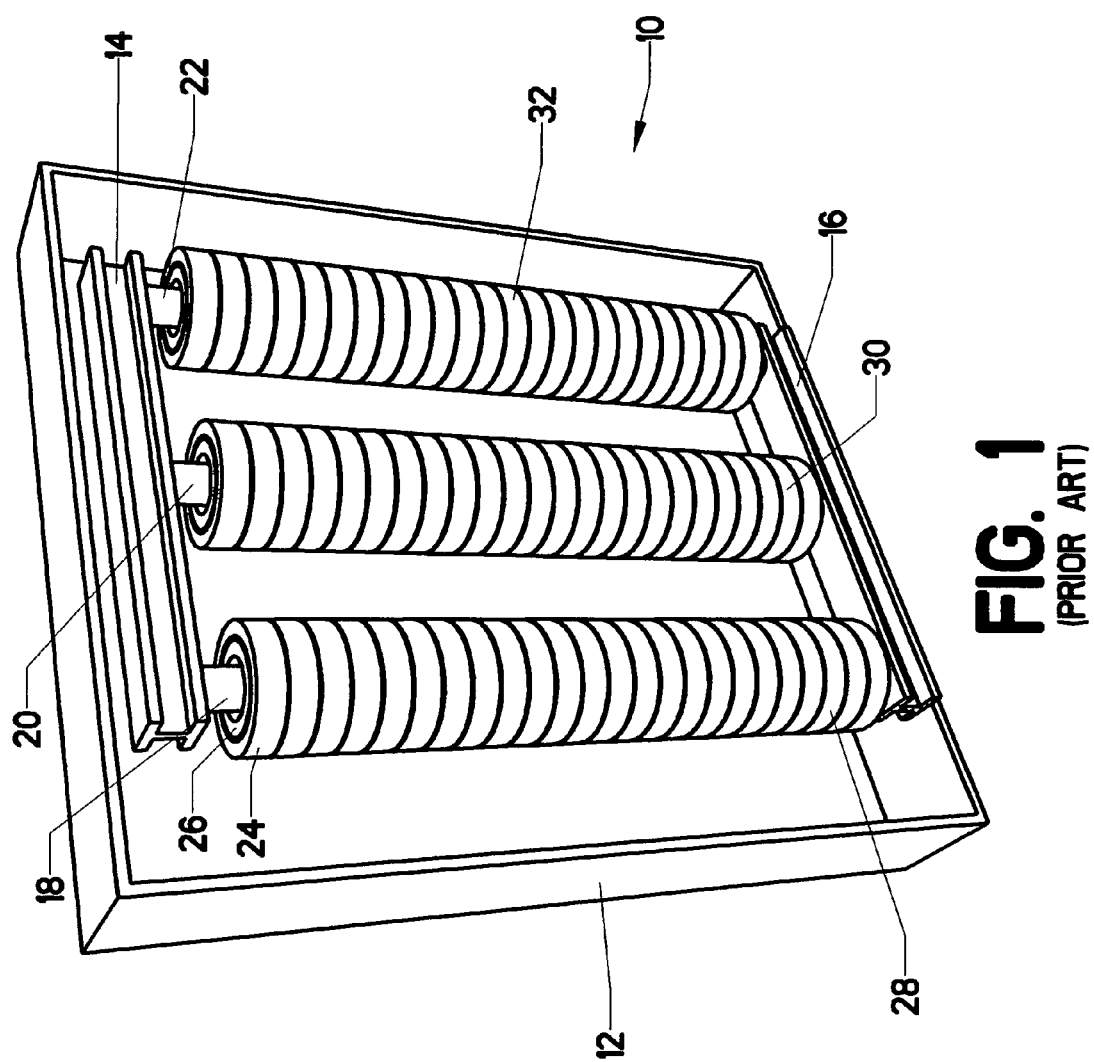
FIG. 1 is a perspective view, showing a prior art transformer.

The ability for a pancake coil such as low aspect pancake coil 34 to carry enormous current—via the use of HTS materials—means that inductive windings no longer have to have a significant axial height (like the prior art device shown in FIG. 1). Instead, efficient inductive devices can be made using one or two pancake coils for each core leg.

Figure 3:
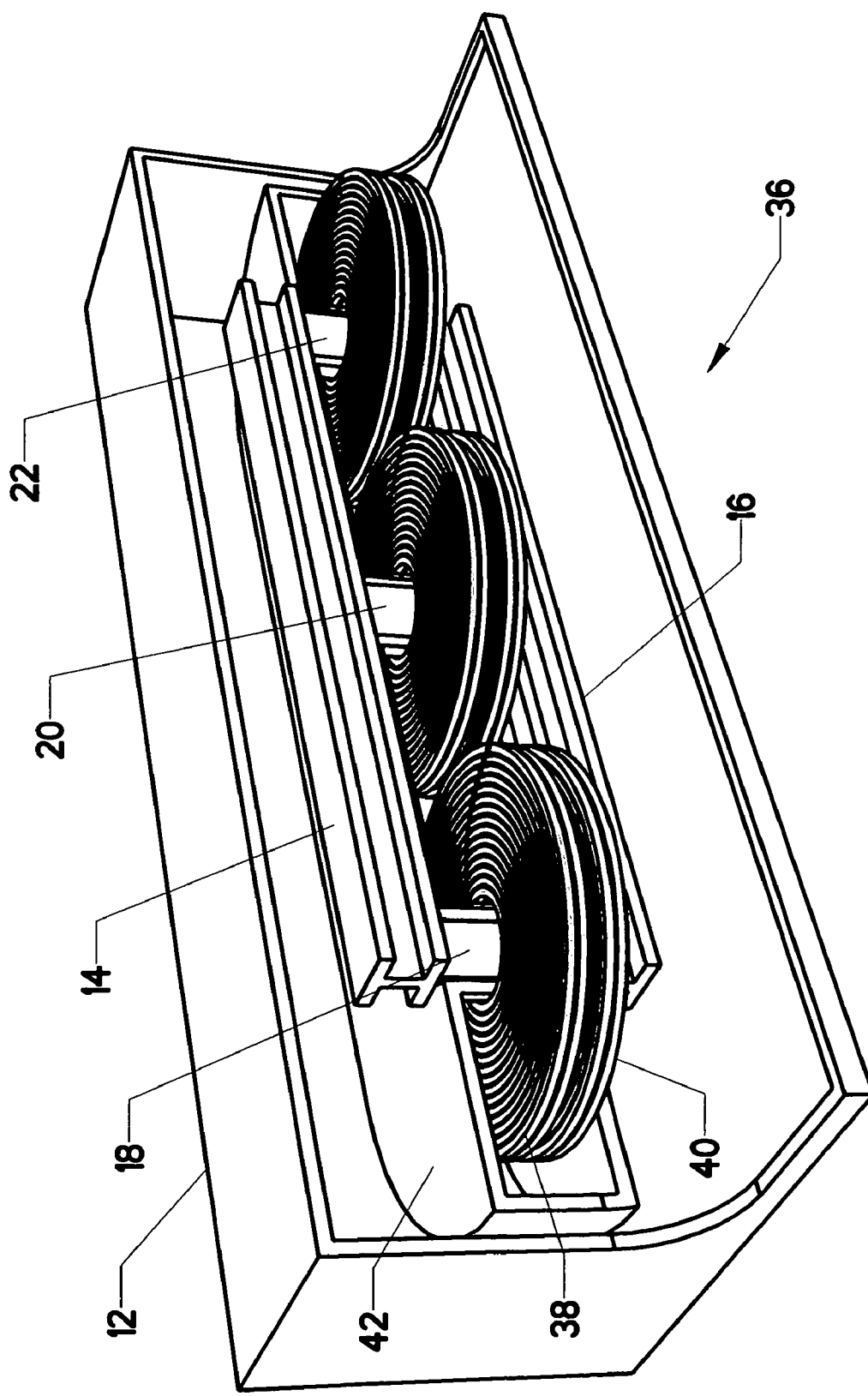
FIG. 3 is a perspective view, showing a transformer using pancake coils.

FIG. 3 shows one such design. Low aspect transformer 36 contains the same major elements as the typical prior art design, also enclosed by a tank 12. The first phase is assembled upon phase 1 core leg 18, the second upon phase 2 core leg 20, and the third upon phase 3 core leg 22. Also like the prior art design, upper yoke 14 and lower yoke 16 structurally support the three core legs. The core legs are electrically insulated from each other, as well as the two yokes.

However, each phase uses only two sets of two pancake coils. The first phase, as an example, has two pancake coils connected in series to form high voltage pancake coil 38. Immediately below this set lies low voltage pancake coil 40—also comprised of two pancake coils connected in series. Those skilled in the art will know that the high voltage and low voltage coils include a different number of total turns in series (in order to use the induction phenomenon to step up or down the voltage). Nevertheless, dimensions of the low voltage and high voltage windings are nearly the same due to the fact that some turns are connected in parallel for the low voltage winding. The second and third phase assemblies are constructed in the same fashion as the first phase assembly.

The embodiment illustrated shows the high voltage and low voltage pancake coils being stacked one on top of the other. Using different winding techniques, it is also possible to create different mechanical constructions. However, as the stacked construction is easy to visualize, it has been employed here.

In order to maintain the pancake coils at the temperature needed for superconductivity, they are encased within cryostat 42 (shown cut away in the view for visualization of the internal components). Cryostat 44 is filled with a cryogenic fluid which is maintained at the appropriate temperature by external systems (not shown). It completely surrounds the sets of pancake coils. It also has three vertical openings, allowing the three core legs to pass through. Obviously, cryostat 42 must be insulated from the various conductors, and must also prevent leakage of the contained fluid.

In studying FIG. 3, the reader will observe that the use of the pancake coil construction has allowed a drastic reduction in the height of each of the three core legs, compared to a prior art transformer. The nature of the pancake coils has, however, also created a substantially greater overall width. This occurs for obvious reasons. Returning to FIG. 2, the reader will note that low aspect pancake coil 34 has an inner circumference and an outer circumference. The outer circumference is substantially displaced from the inner one. Thus, since the inner circumference must be placed next to the core leg, the overall diameter of the winding substantially increases over the prior art device shown in FIG. 1.

Figure 4:
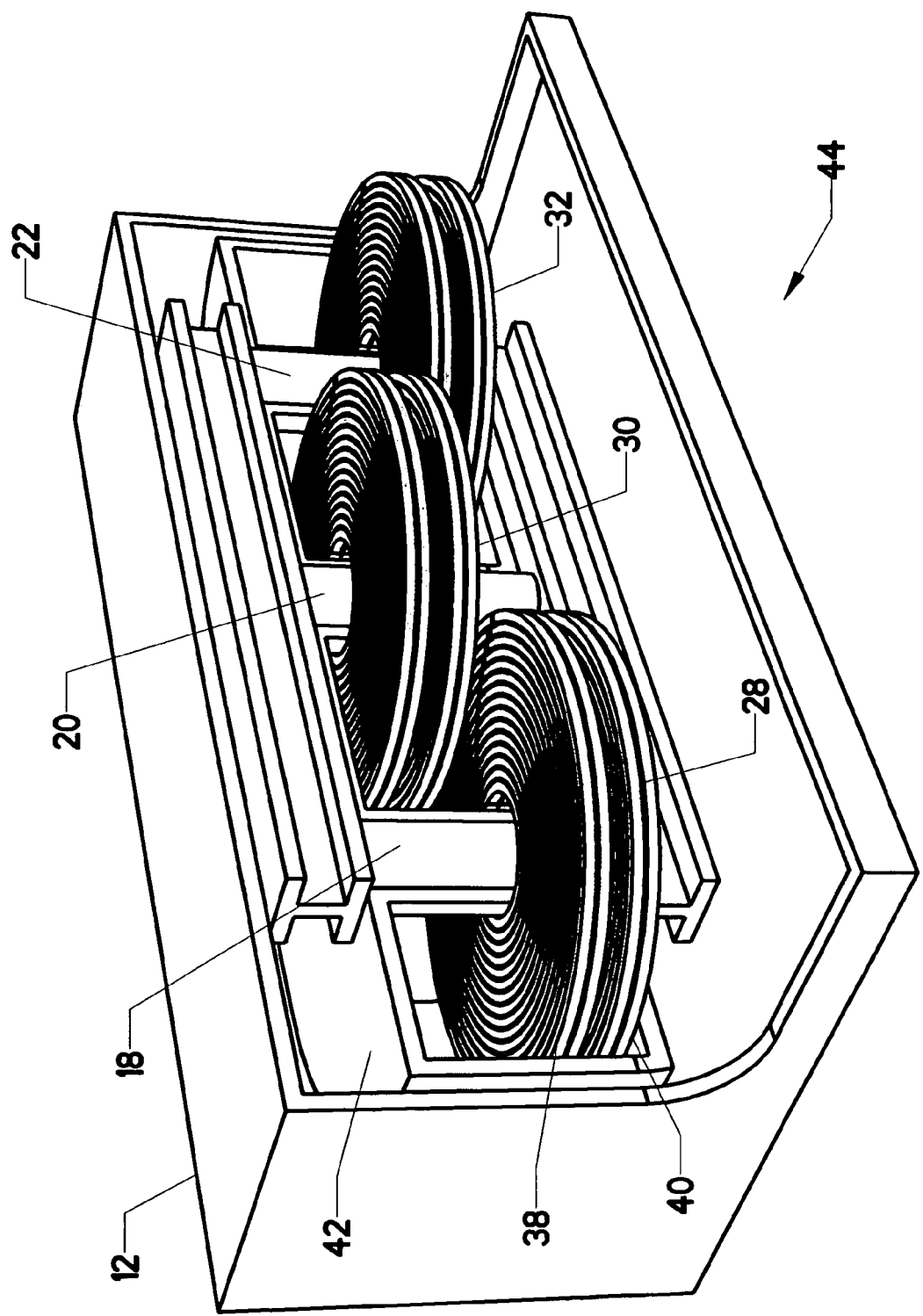
FIG. 4 is a perspective view, showing a transformer using overlapping pancake coils.

Returning to FIG. 3, it is obvious that this increase in diameter is tripled by the presence of the three phases. FIG. 4 shows one embodiment of the present invention, denoted as overlapped transformer 44. The elements contained within the device are identical to low aspect transformer 36, including the use of cryostat 42. However, in overlapped transformer 44, adjacent sets of pancake coils have been overlapped to conserve width. The reader will observe that a portion of the pancake coil assembly centered on phase 2 core leg 20 lies over portions of the pancake coil assemblies centered on phase 1 core leg 18 and phase 3 core leg 22.

The shape of cryostat 42 and the height of the core legs must be altered to accommodate this overlap. In comparison to low aspect transformer 36, overlapped transformer 44 is somewhat taller, but also significantly less wide.

The type of overlapping shown is by no means the only possibility. The three assemblies could be overlapped in a staircase fashion just as easily. Likewise, although it is customary to arrange the three core legs in a line, this need not be the case. They could just as easily be placed at the corners of an isosceles triangle. The overlapping principle disclosed would be equally applicable to the triangular arrangement. Many other geometries are possible.

Although a three phase transformer has been shown, the principle also applies equally to two phase devices (where one coil assembly would overlap the other). Likewise, although transformers have been used to illustrate the invention, it would apply to virtually any type of device operating on the principle of electrical induction.

Those skilled in the art will know that many more internal elements are needed for the construction of a practical transformer than are illustrated in FIGS. 3 and 4. These elements, such as insulators and coil taps, are well known to those skilled in the art. As they are not relevant to the novel aspects of the invention, they have not been illustrated nor described in detail.

The preceding descriptions do contain significant detail regarding the novel aspects. They should not be construed, however, as limiting the scope of the invention but rather as providing illustrations of the preferred embodiments of the invention. Thus, the scope of the invention should be fixed by the following claims, rather than by the examples given.

Having described our invention, we claim:

1. An inductive electrical device for use with multiphase electricity, comprising:
   a. a first core leg, having a central axis;
   b. a first pancake coil, wherein said first pancake coil has a height, an inner circumference, and an outer circumference, and wherein the difference between the diameter of said first pancake coil at said outer circumference and the diameter at said inner circumference is substantially greater than said height of said first pancake coil;
   c. wherein said first pancake coil is placed proximate said first core leg, with said inner circumference being aligned with said central axis of said first core leg;
   d. a second core leg, having a central axis, wherein said central axis of said second core leg lies parallel to said central axis of said first core leg;
   e. a second pancake coil, wherein said second pancake coil has a height, an inner circumference, and an outer circumference, and wherein the difference between the diameter of said second pancake coil at said outer circumference and the diameter at said inner circumference is substantially greater than said height of said second pancake coil;
   f. wherein said second pancake coil is placed proximate said second core leg, with said inner circumference being aligned with said central axis of said second core leg; and
   g. wherein said second core leg is displaced from said first core leg by a distance which results in a portion of said first pancake coil overlapping a portion of said second pancake coil.

2. A device as recited in claim 1, further comprising:
a. a third core leg, having a central axis, wherein said central axis of said third core leg lies parallel to said central axis of said first core leg;
b. a third pancake coil, wherein said third pancake coil has a height, an inner circumference, and an outer circumference, and wherein the difference between the diameter of said third pancake coil at said outer circumference and the diameter at said inner circumference is substantially greater than said height of said third pancake coil;
c. wherein said third pancake coil is placed proximate said third core leg, with said inner circumference being aligned with said central axis of said third core leg; and
d. wherein said third core leg is displaced from said second core leg by a distance which results in a portion of said second pancake coil overlapping a portion of said third pancake coil.

3. A device as recited in claim 2, wherein said first and second pancake coils are made of superconducting materials.

4. A device as recited in claim 3, wherein said superconducting materials are maintained in a superconducting state through the use of a cryostat.

5. A device as recited in claim 1, wherein said first and second pancake coils are made of superconducting materials.

6. A device as recited in claim 5, wherein said superconducting materials are maintained in a superconducting state through the use of a cryostat.

* * * * *